United States Patent

Coho

[11] 3,733,669
[45] May 22, 1973

[54] REACTION RAIL PRETENSION METHOD

[75] Inventor: Owen C. Coho, Erie, Pa.

[73] Assignee: General Electric Company, Erie, Pa.

[22] Filed: Jan. 3, 1972

[21] Appl. No.: 214,973

[52] U.S. Cl................29/155 R, 29/446, 52/223
[51] Int. Cl....................B23p 17/00, B23p 11/02
[58] Field of Search..................29/155 R, 446; 52/223, 225; 14/13

[56] References Cited

UNITED STATES PATENTS

| | | | |
|---|---|---|---|
| 2,413,990 | 1/1947 | Muntz | 52/223 |
| 3,010,257 | 11/1961 | Naillon | 52/225 |
| 3,101,272 | 8/1963 | Setzer | 29/155 X |
| 3,121,894 | 2/1964 | Cheng | 14/13 |
| 3,294,608 | 12/1966 | Peterson | 29/446 X |

Primary Examiner—Thomas H. Eager
Attorney—Walter C. Bernkopf

[57] ABSTRACT

A method of prestressing a reaction rail for a linear induction motor by securing the lower convex surface of a longitudinally curvilinear rail to a rigid planar base to place them in contiguous relationship along the length of the rail, and to thereby place the upper and lower portions thereof in conditions of tension and compression, respectively.

7 Claims, 5 Drawing Figures

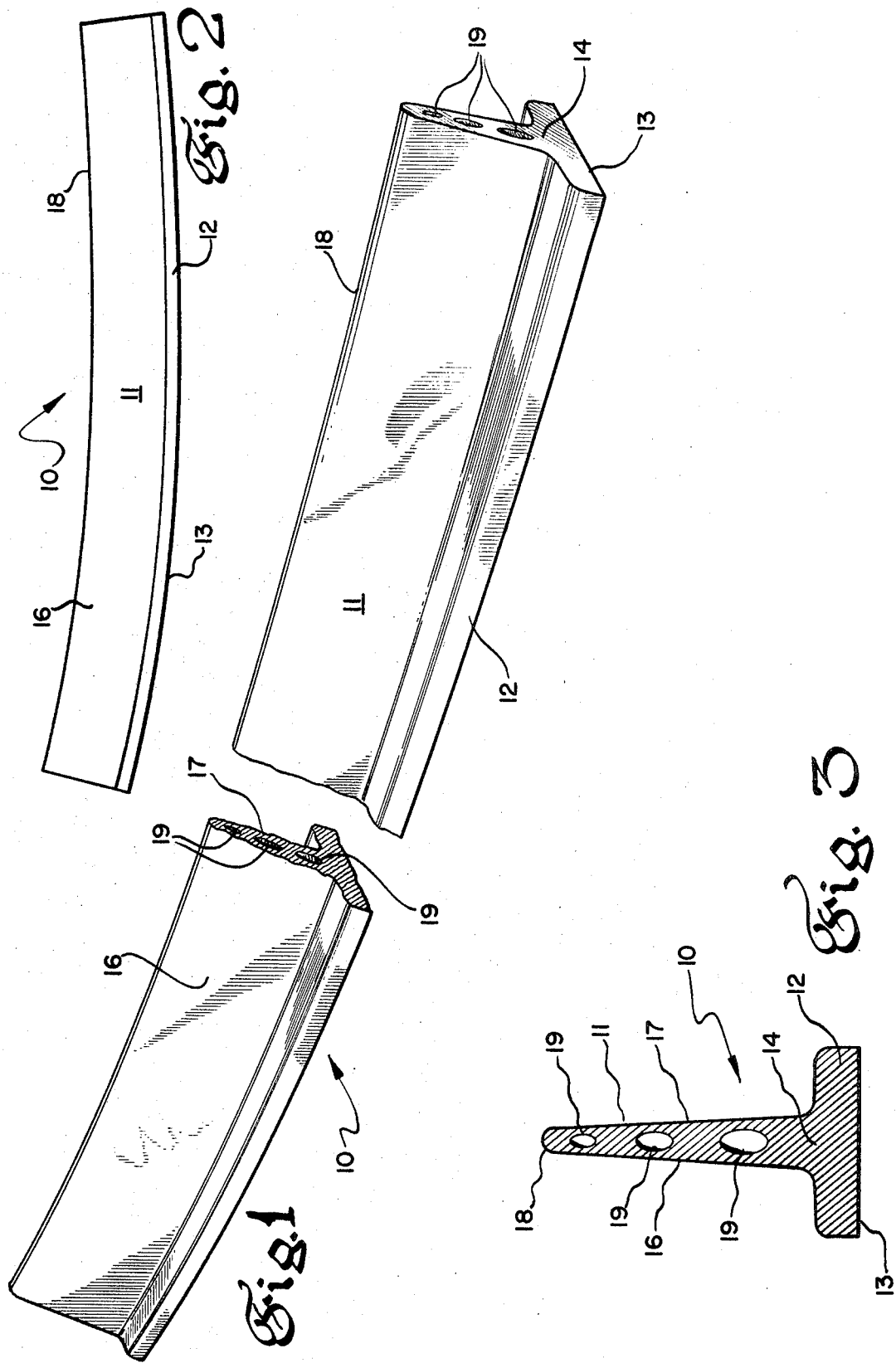

REACTION RAIL PRETENSION METHOD

BACKGROUND OF THE INVENTION

This invention relates generally to railways and more particularly to the installation of an inverted-T reaction rail for a linear induction motor.

It has long been common practice to provide rails for the guidance and support of vehicles. The inverted-T design is most practical since it provides a wide base for lateral stability and vertical reaction with the road bed, while providing, with a minimum of material, a vertical section for transmitting the load and guiding the vehicle. Because of the stable condition of the load, which is made possible by the uniformity of the railway, extremely heavy loads are transported over the rails. Accordingly, common traction rails are made heavy and durable to withstand the stresses brought about by the successive loading and unloading of the rail along its length.

When rails are used in combination with linear induction motors they serve a third purpose in addition to support and guidance. They become part of the motor and may act as either the stator element or the rotor element, the latter being the preferred arrangement. When serving as a rotor element the rail is adapted to have a current induced therein by the field of the stator, with the current producing a magnetic field for interaction with the stator field to cause the stator to be propelled along the track. Since the propelling force is proportional to the current induced, an effort is made to maximize the induced current for a given stator field by using for the rail a highly conductive material such as copper or aluminum or the like. This necessarily detracts from the strength characteristics of the rail.

One of the immediate results of a change of shape from a conventional cylindrical induction motor to that of a flat linear configuration is that the opposite side of the secondary becomes available for the application of further m.m.f. virtially without an increase in secondary material. This double sided technique allows the oppositely disposed primary blocks to complement each other in driving flux through the secondary conductor, as well as offsetting the magnetic pull between secondary and primary elements. The thickness of the reaction rail over the areas swept by the primary pole-faces contribute to the effective air gap and should therefore be minimized. The rail should therefore be of substantial surface area and minimal thickness, and yet offer the required support strength to prevent its failing under stress.

To further the problem of providing a suitable rail, if lateral magnetic pull and severe skin effects are to be avoided, the rail must be a nonmagnetic conductor. In addition, the use of ferrous material would tend to create other losses which would not otherwise occur. Accordingly, it is desirable to use a low resistance, nonferrous material. Relative tensile strength as well as cost is therefore a prime consideration in the design thereof.

Another consideration which is peculiar to rails of the linear motor reaction type is that of heat generated therein as the primary of the linear motor traverses its sections and induces a current therein. The resulting temperature increases, as well as ambient temperature changes, tend to lessen the rigidity of the rail and cause it to buckle. This phenomena is of prime importance in a linear induction reaction rail, on which high speeds are attained and on which maintenance of a substantially constant air gap is considered critical.

Unlike a traction rail which supports heavy vertical loads, a reaction rail is not called upon to do so since there are other methods of providing support, such as the air cushion technique. The forces caused by thermal expansion then, as well as those applied by the magnetic reaction forces, become significant when the unique nature of the reaction rail is considered.

The requirements for noise reduction coupled with that of high speed stability has brought about the use of continuous welded rails with a corresponding elimination of thermal expansion joints. Such a rail system must assume, within the rail itself, any contraction or expansion which is caused by temperature changes.

One technique employed to obtain strength while retaining the desired characteristics of the rail is to pretension the rail during installation. If sufficient pretension strain is made, it will remain in tension under the normal range of temperature changes.

The present method of prestressing involves the installing and clamping of long rail sections on a very hot day, with supplementary heating if necessary, so that when the rail cools it will then be in tension. This process is extremely awkward and costly, and presents problems of section replacement due to the inter-force relationship between adjacent sections.

Another technique for placing continuous welded rails in tension involves that of clamping on and longitudinally stretching the rail sections with the use of powerful mechanical devices. This method is not only time consuming and expensive but is also not adapted to use with rails of low strength materials.

It is therefore an object of this invention to provide a new and improved method of installing a linear motor reaction rail.

Another object of this invention is the provision for installing sections of reaction rail in a prestressed condition so that they are better able to withstand forces exerted thereon.

A further object of this invention is the provision for installing reaction rails in tension without the application of heat thereto.

Yet another object of this invention is the provision for a prestressed reaction railway which allows any of its discrete sections to be removed without disturbing the prestressing characteristics of adjacent sections.

Still another object of this invention is the provision for installing in a prestressed condition, a linear induction motor reaction railway, by a method which is extremely easy, economical, and effective.

These objects and other features and advantages become more readily apparent upon reference to the following description when taken in conjunction with the appended drawings.

SUMMARY OF THE INVENTION

This invention relates to a method for individually pretensioning sections of linear motor reaction rail as it is installed on a planar base, so as to enable it to withstand successive forces exerted thereon. The individual rail sections are formed in curved lengths with the downward side in a convex shape. The curved sections are then secured along their lengths with the lower surface in contiguity with a planar base surface, thereby placing the upper portion in tension and the bottom portion in compression. The combination allows greater forces and temperature to be applied to the rail without resultant failure. The removal of a single rail may be effected without disrupting the stressed conditions of adjacent members.

BRIEF DESCRIPTION OF THE DRAWINGS

FIG. 1 is a perspective view of a rail section of the preferred embodiment.

FIG. 2 is a side view thereof displaying an exaggerated curvature for illustrative purposes.

FIG. 3 is a vertical transverse sectional view of a preferred embodiment rail section.

Figure 4:
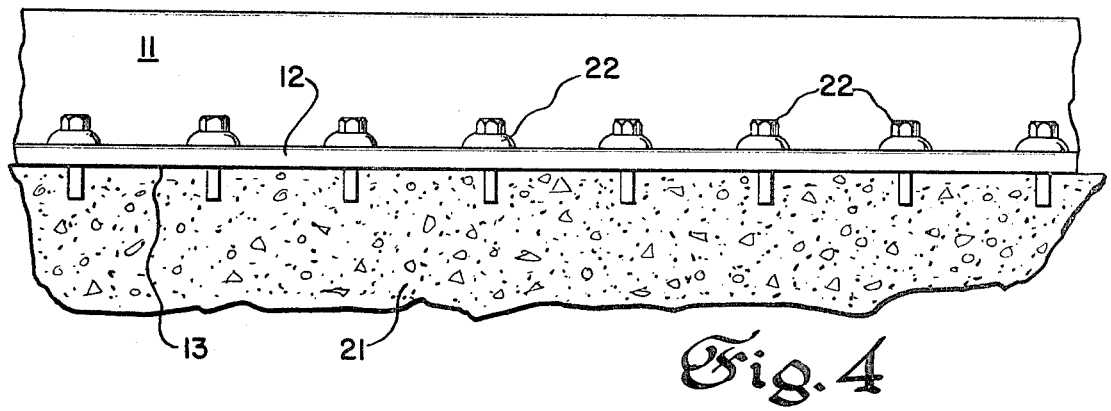
FIG. 4 is a fragmentary side elevational view of a preferred embodiment rail section in an installed position.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

The process hereinafter described may be applied to many different types of railway installations but is of particular value when applied to railways for linear induction motors. The rail of the preferred embodiment is a continuous welded reaction railway adapted to be used in combination with a double-sided linear induction motor of the "short primary" type, wherein vertical support of the motor is provided for by other means independent from the reaction rail.

Reference is now made to FIGS. 1, 2 and 3 wherein the rail of the preferred embodiment is indicated generally at 10. It comprises the integral base and vertical portions 11 and 12, respectively, in the form of an inverted-"T."

The base portion 12 has a flat bottom surface 13 which is adapted to be installed in contiguous relationship with a planar base surface and secured thereto. The base 12 can be made of any appropriate material, but the same material as is used in the vertical section 11 preferred because it can be made integrally as a part of the same extrusion, which is the usual method of manufacturing, and because of the undesirability of disturbing the flux pattern which is the vertical portion 11. Support is the principle function of the base portion and therefore its design requirements are chiefly mechanical, the main concern being that of providing sufficient strength to withstand forces transmitted thereto from its integral vertical portion. Accordingly, the width and thickness of the base portion is relatively large in comparison with the dimensions of the vertical portion, which must display certain electrical and magnetic qualities.

As shown in FIGS. 1 and 2, the rail in its uninstalled condition is slightly curvilinear along its length with its ends curving upwardly froma horizontal plane. The curvature is exaggerated in FIG. 2 for illustrative purposes. Such a curvilinear form can be readily accomplished in a common extrusion process by proper forming of the extrusion die. The specific method of thus forming the rail sections is not critical to this invention, but only the fact that in its unstressed form, the longitudinal profile of the rail is convex relative to a horizontal planar surface.

FIGS. 1 and 3 indicate one embodiment of the vertical portion 11 of the rail, such portion being integrally secured to the base portion along a substantially central longitudinal line 14. Its height is such that the surface areas of the sides 16 and 17 are sufficiently large to give the desired induction and reaction characteristics when used in combination with a double sided linear induction motor. As can be seen in FIG. 3, a slight taper may exist with the upper free end 18 being thinner in cross section than the lower end which connects to the base portion.

A plurality of parallel channels 19 extend longitudinally through the length of the rail, their principle purpose being to economize in material. A coolant may be placed in these channels to aid in the effort of maintaining the rail in a relatively low temperature condition.

The installation of the curvilinear rail sections requires a downward force to be applied to the end portions thereof to bring the base bottom surface 13 into contiguity with a planar foundation 21 as shown in FIG. 4. A plurality of securing devices 22, such as bolts or the like, are inserted along the length of the base portion to rigidly secure the rail to the foundation in a biased condition. The length of the rail is not critical, but for ease in handling and minimization of joints, lengths of 100 feet would be practical. After adjacent sections are installed with their respective ends abutting each other, a joint may be completed by welding or the like if performance characteristics require it.

The degree of curvature which is placed in the rail sections during the extrusion process may be varied in relation to the amount of prestressing that is desired for the particular railway application. The greater the prestressing desired, the greater the degree of curvature should be. Railways in geographical areas wherein the ambient temperatures do not rise to any high degree, will tend to be less concerned with thermal expansion and will therefore require a minimum of curvature, whereas railways in the torrid zone wherein high ambient temperatures occur, will expand appreciably and will require prestressing to a higher degree. Except under conditions of slow speed and high acceleration, thermal expansion brought about by inductive heating of the rail is considered to be negligible as compared with that caused by ambient temperature changes.

Figure 5:
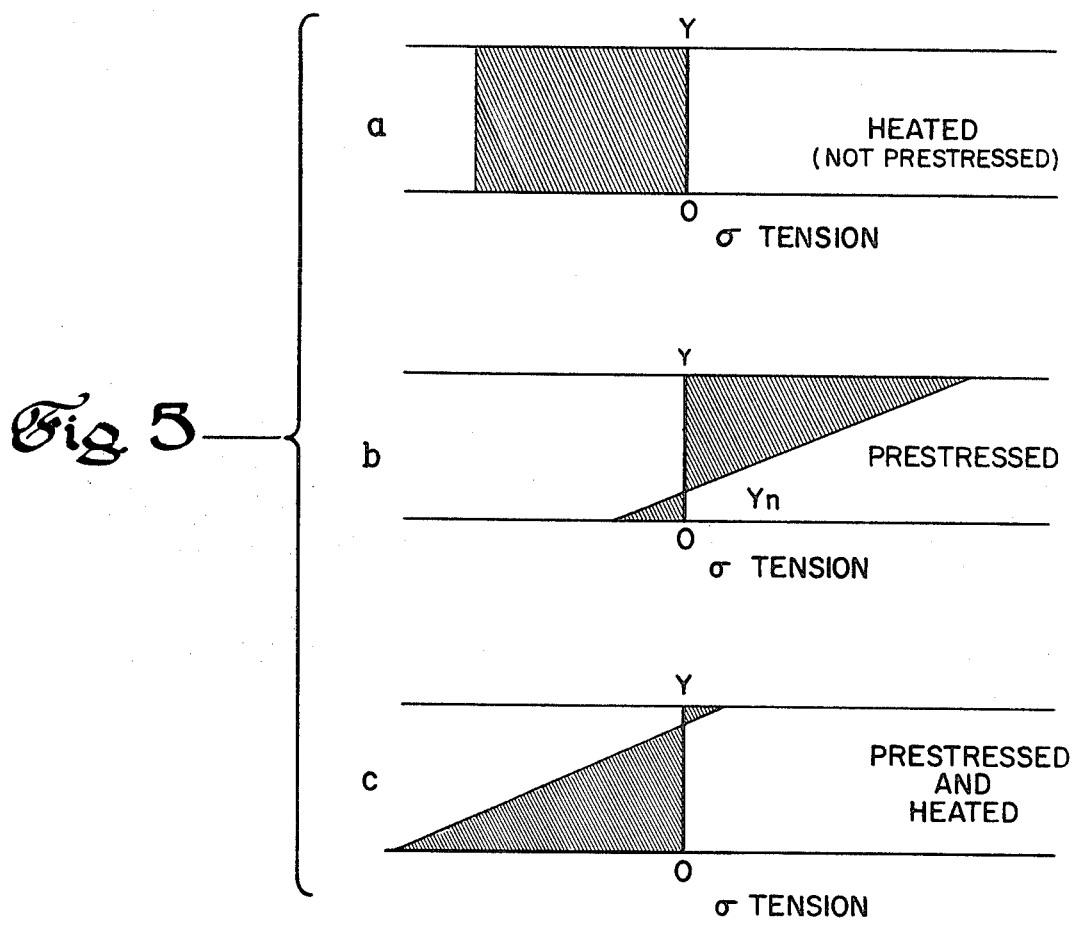
FIG. 5 is a graphic display of longitudinal stresses along a vertical axis of a rail section, as affected by certain conditions.

FIG. 5 is illustrative of the longitudinal forces which exist on a vertical axis of a rail section. The tension and compression values are plotted with respect to the vertical coordinate of the rail. FIG. 5a is an indication of the uniform compressive forces which exist in a rail which was not prestressed and which was heated to thermally expand. It should be noted that the compressive forces at the top thin portion of the rail are equal to those at the bottom thereof and may be of sufficient magnitude to cause buckling of the rail. FIG. 5b is illustrative of the tensile forces existing in an unheated rail which has been installed in a prestressed condition as herein before described. Note that the upper portion is in tension of varying degrees while the lower portion is in compression of varying degrees. An intermediate point n on the vertical axis of the rail exhibits neither tension nor compression and is considered to be on a neutral axis. FIG. 5c displays the forces existing in a rail which has been installed in a prestressed condition and which has thermally expanded. Notice that the upper edge of the rail has only small longitudinal forces existing therein, and that the lower edge has considerably greater compressive forces than those which were created in a non-prestressed rail. A point on the original neutral axis of 5b now displays a compressive force which is equal to that in FIG. 5a. The result of the prestressing is therefore to transfer the compressive forces from the weaker upper portion, which is likely to buckle, to the heavier lower portion which can withstand the forces. As discussed hereinabove the degree of prestressing can be varied to provide the desired relationship between the forces in the upper and lower portions of the rail.

What I claim as new and desire to secure by Letters Patent of the United States are:

1. A method of prestressing sections of elongate rail for reaction with a linear induction motor the method comprising:
   a. forming said rail in a longitudinally curvilinear configuration wherein, in an unloaded condition, its end portions slope upwardly with respect to a horizontal plane;
   b. placing said rail on a rigid planar base;
   c. securing said rail to said base in a plurality of spaced points along the length of said rail;
   d. wherein said rail is brought into alignment with said planar base and the upper portion of said rail is placed in a condition of tension and the lower portion thereof is placed in a condition of compression.

2. A method of prestressing sections of elongate rail as defined in claim 1 wherein said rail is of the inverted "T" type and wherein the vertical portion thereof is prone to buckling from thermal expansion along the longitudinal axis.

3. A method of prestressing sections of elongate rail as defined in claim 1 wherein said rail is made of a non-magnetic conducting material.

4. A method of installing a reaction railway for use with a linear induction motor the method comprising:
   a. forming sections of rails of longitudinal curvilinear configuration wherein the end portions thereof slope upwardly with respect to a horizontal plane;
   b. placing said rails on a rigid planar base in end-to-end relationship;
   c. successively securing said rails to said base wherein said rails are brought into alignment with said planar base and wherein the upper portions thereof are placed in a condition of tension and the lower portions thereof are placed in a condition of compression.

5. A method of installing a reaction railway as defined in claim 4 and including a further step of joining said adjacent rail sections at the respective ends thereof by appropriate means such as by welding.

6. A method of installing a reaction railway as defined in claim 4 wherein said rail is of the inverted "T" type and wherein the vertical portion thereof is prone to buckling from thermal expansion along the longitudinal axis.

7. A method of installing a reaction railway as defined in claim 4 wherein said rail is made of a non-magnetic conducting material.

* * * * *